United States Patent
Woo et al.

(10) Patent No.: US 12,399,737 B2
(45) Date of Patent: Aug. 26, 2025

(54) PREEMPTING A QUANTUM PROGRAM IN A QUANTUM COMPUTING DEVICE

(71) Applicant: International Business Machines Corporation, Armonk, NY (US)

(72) Inventors: Ryan Woo, Tenafly, NJ (US); Atsuko Shimizu, Mount Kisco, NY (US); Kang Bae, Ridgefield, NJ (US); Jessie Yu, Pleasant Valley, NY (US); Andrew Wack, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 17/880,510

(22) Filed: Aug. 3, 2022

(65) Prior Publication Data
US 2024/0045711 A1 Feb. 8, 2024

(51) Int. Cl.
*G06F 9/48* (2006.01)
*G06N 10/80* (2022.01)

(52) U.S. Cl.
CPC ........... *G06F 9/485* (2013.01); *G06F 9/4881* (2013.01); *G06N 10/80* (2022.01)

(58) Field of Classification Search
None
See application file for complete search history.

(56) References Cited

U.S. PATENT DOCUMENTS

| 5,127,098 A * | 6/1992 | Rosenthal ............. G06F 9/4881 |
| | | 718/107 |
| 7,458,077 B2 * | 11/2008 | Duke .................... G06F 9/4881 |
| | | 718/100 |

(Continued)

FOREIGN PATENT DOCUMENTS

| CN | 119631057 A | 3/2025 |
| EP | 4565955 A1 | 6/2025 |
| WO | 2024/028152 A1 | 2/2024 |

OTHER PUBLICATIONS

Ward, Jr., et al., Scheduling Jobs on Parallel Systems Using a Relaxed Backfill Strategy, Conference Paper in Lecture Notes in Computer Science, Sep. 2002, pp. 1-11.

(Continued)

*Primary Examiner* — Van H Nguyen
(74) *Attorney, Agent, or Firm* — Shackelford, McKinley & Norton, LLP; Robert A. Voigt, Jr.

(57) ABSTRACT

A method and quantum computing device for preempting a quantum program. A first quantum circuit is executed by a quantum processor to process a first job of the quantum program for a number of shots, where the number of shots defines how many times a quantum circuit is to be repeatedly executed. The execution of the first quantum circuit to process the first job is then preempted, such as to allow a higher priority and/or shorter-running job to be processed. Upon preempting the execution of the first quantum circuit, the quantum processor executes a second quantum circuit to process a second job (e.g., higher priority and/or shorter-running job to be processed). Upon completion or preemption of the execution of the second quantum circuit to process the second job, the quantum processor completes the execution of the first quantum circuit to process the first job.

20 Claims, 6 Drawing Sheets

(56) References Cited

U.S. PATENT DOCUMENTS

| | | | |
|---|---|---|---|
| 7,971,205 B2* | 6/2011 | Heffley | G06F 9/4812 |
| | | | 710/262 |
| 8,963,933 B2 | 2/2015 | Hartog et al. | |
| 9,697,020 B2 | 7/2017 | Maclay | |
| 10,761,915 B2 | 9/2020 | Mahindru et al. | |
| 10,838,803 B2 | 11/2020 | Mahindru et al. | |
| 11,521,103 B1* | 12/2022 | Reagor | G06N 10/60 |
| 11,562,284 B1* | 1/2023 | Ryan | H03K 19/195 |
| 2014/0022263 A1 | 1/2014 | Hartog et al. | |
| 2014/0309980 A1 | 10/2014 | Maclay | |
| 2020/0097347 A1 | 3/2020 | Mahindru et al. | |
| 2020/0097358 A1 | 3/2020 | Mahindru et al. | |
| 2020/0117511 A1 | 4/2020 | Reinhardt | |
| 2020/0401427 A1 | 12/2020 | Gambetta et al. | |
| 2021/0334128 A1 | 10/2021 | Zeng | |
| 2022/0318052 A1* | 10/2022 | Sivathanu | G06F 9/505 |

OTHER PUBLICATIONS

Ahsan et al., "Designing a Million-Qubit Quantum Computer Using Resource Performance Simulator," ACM Journal on Emerging Technologies in Computing Systems, Article 392, Sep. 2015, pp. 1-25.

Fernandes De Araujo et al., "Operating System Support for IPNoSys," CLEI Electronic Journal, vol. 15, No. 2, Paper 4, Aug. 2012, pp. 1-14.

Anonymous, "An Intelligent Job Schedule Method in Data Process System," IP.com, IPCOM000264517D, Dec. 31, 2020, pp. 1-2.

Anonymous, "Method and Apparatus for Job Scheduling with Intelligent Data Awareness," IP.com, PCOM000241479D, May 5, 2015, pp. 1-4.

Brian Bouta, "An Event Driven Job Scheduler for a Data Pipeline," IP.com, IPCOM000233329D, Dec. 6, 2013, pp. 1-4.

Fu et al., "An Experimental Microarchitecture for a Superconducting Quantum Processor," arXiv:1708.07677v1, Aug. 25, 2017, pp. 1-13.

Kong et al., "Origin Plot: A Quantum Operating System for Efficient Usage of Quantum Resources," arXiv:2105.10730v1, May 22, 2021, pp. 1-12.

Ding et al., "Quantum Computer Systems Research for Noisy Intermediate-Scale Quantum Computers," Synthesis Lectures on Computer Architecture #51, pp. 1-22.

Ravi et al., "Stairway to Quantum," https://www.sigarch.org/stairway-to-quantum, Feb. 4, 2021, pp. 1-9.

Ding et al., "Putting Qubits to Work—Quantum Memory Management," https://www.sigarch.org/putting-qubits-to-work-quantum-memory-management, Jul. 21, 2020, pp. 1-9.

Thaker et al., "Quantum Memory Hierarchies: Efficient Designs to Match Available Parallelism in Quantum Computing," arXiv:quant-ph/0604070v1, Apr. 10, 2006, pp. 1-12.

Jeff Shepard, "Quantum computing system architectures," https://www.microcontrollertips.com/quantum-computing-system-architectures, May 21, 2021, pp. 1-6.

Duckering et al., "Virtualized Logical Qubits: A 2.5D Architecture for Error-Corrected Quantum Computing," arXiv:2009.01982v1, Sep. 4, 2020, pp. 1-13.

International Search Report and the Written Opinion of the International Searching Authority for International Application No. PCT/EP2023/070507 dated Nov. 2, 2023, pp. 1-12.

"Preemption (computing)", WIKIPEDIA—The Free Encyclopedia, May 28, 2025, 04 pages, https://en.wikipedia.org/wiki/Preemption_(computing).

* cited by examiner

PREEMPTING A QUANTUM PROGRAM IN A QUANTUM COMPUTING DEVICE

TECHNICAL FIELD

The present disclosure relates generally to preemption, and more particularly to preempting a quantum program in a quantum computing device.

BACKGROUND

In computing, preemption is the act of temporarily interrupting an executing task, with the intention of resuming it at a later time. This interrupt may be performed by a component, referred to as a "scheduler," with no assistance or cooperation from the task. This preemptive scheduler usually runs in the most privileged protection ring, meaning that interruption and resuming are considered highly secure actions. Such a change in the currently executing task of a processor is known as context switching.

One type of computing technology currently being developed is known as "quantum computing." Quantum computing is a type of computation that harnesses the collective properties of quantum states, such as superposition, interference, and entanglement, to perform calculations. The devices that perform quantum computations are known as quantum computers.

Currently, such quantum computers do not have the capability of implementing preemption as classical computers/classical schedulers implement. A "classical computer" is a computing device in which information is stored in bits that are represented logically by either a 0 (off) or a 1 (on). A "classical scheduler" is a scheduler of a classical computing device that controls the program execution of jobs. A "job" is a unit work made up of one or more tasks, which when performed, signify the execution of a job.

Such classical schedulers are utilized by a classical computer in order to more efficiently execute jobs thereby improving throughput (volume of work or information flowing through a system) and improving efficiency in using computing resources. For example, the classical scheduler may determine that throughput and efficiency can be improved by executing a high priority job prior to a low priority job. In such an example, the classical scheduler may preempt a currently executed low priority job thereby allowing execution of the high priority job prior to the completion of the low priority job. In another example, the classical scheduler may determine that throughput and efficiency can be improved by executing a short-running job (time to execute job is a relatively short period of time) prior to a long-running job (time to execute job is a relatively long period of time). In such an example, the classical scheduler may preempt a currently executed long-running job thereby allowing execution of the short-running job prior to the completion of the long-running job.

As a result of not being able to utilize preemption as classical computers/classical schedulers implement, high priority quantum jobs and/or short-running quantum jobs may remain unexecuted for a duration of time as a low priority and/or long-running quantum job is being executed thereby resulting in reduced throughput and inefficient use of computing resources by the quantum computer. For example, high priority quantum jobs, such as calibrations and periodic updates, occur regularly and need to be executed without delay. However, by not being able to interrupt the processing of a job, such as a long-running, low priority quantum job currently being executed, such high priority quantum jobs have to wait to be executed until the long-running, low priority quantity job has completed execution resulting in reduced throughput and an inefficient use of computing resources by the quantum computer.

SUMMARY

In one embodiment of the present disclosure, a method for preempting a quantum program comprises executing a first quantum circuit to process a first job of the quantum program for a number of shots, where the number of shots defines how many times a quantum circuit is to be repeatedly executed. The method further comprises preempting execution of the first quantum circuit to process the first job. The method additionally comprises executing a second quantum circuit to process a second job in response to the preemption of execution of the first quantum circuit. Furthermore, the method comprises completing execution of the first quantum circuit to process the first job in response to completion of the execution of the second quantum circuit to process the second job or upon preemption of the execution of the second quantum circuit to process the second job.

In this manner, quantum computers are able to preempt a quantum program, such that high priority quantum jobs and/or short-running quantum jobs may be able to run and finish earlier with respect to a low priority and/or long-running quantum job even if the low priority and/or long-running quantum job was previously executed. As a result, throughput may be improved.

In another embodiment of the present disclosure, a quantum computing device comprises a quantum processor configured to perform computational tasks, where the quantum processor includes one or more quantum circuits. Furthermore, the quantum processor is configured to execute a first quantum circuit to process a first job of a quantum program for a number of shots, where the number of shots defines how many times a quantum circuit is to be repeatedly executed. The quantum computing device further comprises a quantum controller configured to preempt execution of the first quantum circuit to process the first job, where the quantum processor executes a second quantum circuit to process a second job in response to the preemption of execution of the first quantum circuit, and where the quantum processor completes execution of the first quantum circuit to process the first job in response to completion of the execution of the second quantum circuit to process the second job or upon preemption of the execution of the second quantum circuit to process the second job.

In this manner, quantum computers are able to preempt a quantum program, such that high priority quantum jobs and/or short-running quantum jobs may be able to run and finish earlier with respect to a low priority and/or long-running quantum job even if the low priority and/or long-running quantum job was previously executed. As a result, throughput may be improved.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
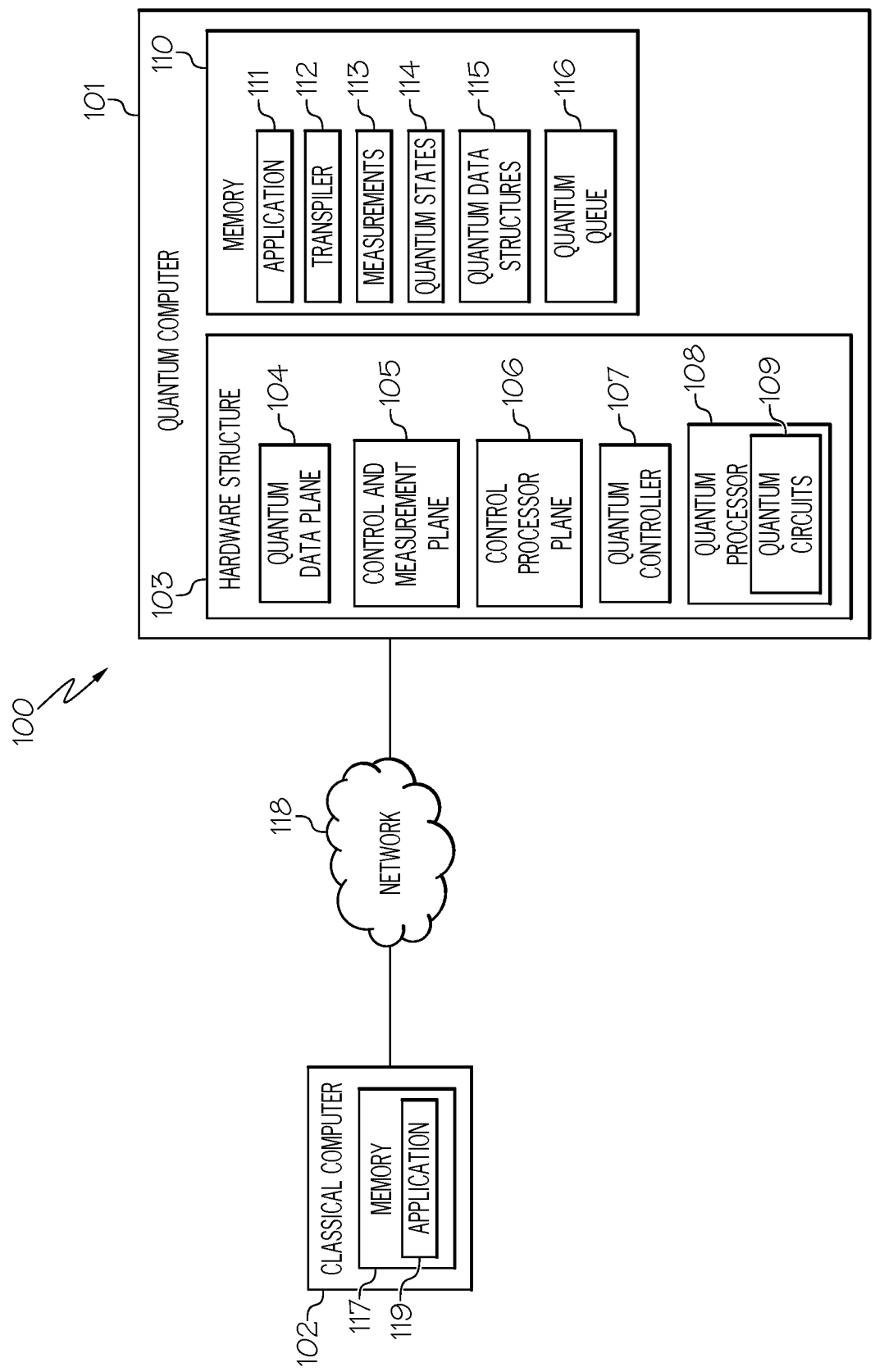
FIG. 1 illustrates a communication system for practicing the principles of the present disclosure in accordance with an embodiment of the present disclosure.

As stated in the Background section, currently, quantum computers do not have the capability of implementing preemption as classical computers/classical schedulers implement. A "classical computer" is a computing device in which information is stored in bits that are represented logically by either a 0 (off) or a 1 (on). A "classical scheduler" is a scheduler of a classical computing device that controls the program execution of jobs. A "job" is a unit work made up of one or more tasks, which when performed, signify the execution of a job.

Such classical schedulers are utilized by a classical computer in order to more efficiently execute jobs thereby improving throughput (volume of work or information flowing through a system) and improving efficiency in using computing resources. For example, the classical scheduler may determine that throughput and efficiency can be improved by executing a high priority job prior to a low priority job. In such an example, the classical scheduler may preempt a currently executed low priority job thereby allowing execution of the high priority job prior to the completion of the low priority job. In another example, the classical scheduler may determine that throughput and efficiency can be improved by executing a short-running job (time to execute job is a relatively short period of time) prior to a long-running job (time to execute job is a relatively long period of time). In such an example, the classical scheduler may preempt a currently executed long-running job thereby allowing execution of the short-running job prior to the completion of the long-running job.

As a result of not being able to utilize preemption as classical computers/classical schedulers implement, high priority quantum jobs and/or short-running quantum jobs may remain unexecuted for a duration of time as a low priority and/or long-running quantum job is being executed thereby resulting in reduced throughput and inefficient use of computing resources by the quantum computer. For example, high priority quantum jobs, such as calibrations and periodic updates, occur regularly and need to be executed without delay. However, by not being able to interrupt the processing of a job, such as a long-running, low priority quantum job currently being executed, such high priority quantum jobs have to wait to be executed until the long-running, low priority quantity job has completed execution resulting in reduced throughput and an inefficient use of computing resources by the quantum computer.

The embodiments of the present disclosure provide a means for enabling quantum computers to preempt a quantum program such that high priority quantum jobs and/or short-running quantum jobs may be able to run and finish earlier with respect to a low priority and/or long-running quantum job even if the low priority and/or long-running quantum job was previously executed. As a result, throughput may be improved.

In some embodiments of the present disclosure, the present disclosure comprises a method and quantum computing device for preempting a quantum program. In one embodiment of the present disclosure, a first quantum circuit is executed by a quantum processor to process a first job of the quantum program for a number of shots, where the number of shots defines how many times a quantum circuit is to be repeatedly executed so as to obtain a better readout of a state of a quantum bit. A "quantum program," as used herein, refers to a sequence of instructions that are capable of running on the quantum computer. In one embodiment, the quantum program defines the quantum circuit and the number of shots executed by the quantum circuit. In one embodiment, a quantum program completes when the quantum circuit has been executed within the defined number of shots. The execution of the first quantum circuit to process the first job is then preempted, such as to allow a higher priority and/or shorter-running job to be processed. Upon preempting the execution of the first quantum circuit to process the first job, the quantum processor executes a second quantum circuit to process a second job (e.g., higher priority and/or shorter-running job to be processed). Upon completion of the execution of the second quantum circuit to process the second job or upon preemption of the execution of the second quantum circuit to process the second job, the quantum processor completes the execution of the first quantum circuit to process the first job. In this manner, quantum computers are able to preempt a quantum program such that high priority quantum jobs and/or short-running quantum jobs may be able to run and finish earlier with respect to a low priority and/or long-running quantum job even if the low priority and/or long-running quantum job was previously executed. As a result, throughput may be improved.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 118 (discussed below).

In one embodiment, classical computer 102 is used to setup the state of quantum bits in quantum computer 101 and then quantum computer 101 starts the quantum process.

In one embodiment, a hardware structure 103 of quantum computer 101 includes a quantum data plane 104, a control and measurement plane 105, a control processor plane 106, a quantum controller 107 and a quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment quantum controller 107 is configured to perform the scheduling of quantum computer 101. That is, quantum controller 107 functions as the quantum program scheduler which can interrupt and preempt a running quantum circuit (discussed below) and select a different quantum circuit to be executed by quantum processor 108.

In one embodiment, quantum processor 108 uses qubits to perform computational tasks. In the particular realms where quantum mechanics operate, particles of matter can exist in multiple states, such as an "on" state, an "off" state and both "on" and "off" states simultaneously. Quantum processor 108 harnesses these quantum states of matter to output signals that are usable in data computing.

In one embodiment, quantum processor 108 performs algorithms which conventional processors are incapable of performing efficiently. In one embodiment, quantum processor 108 includes its own data, boot files, operating system images and applications. Alternatively, as discussed further below, memory 110 may provide data, such as boot files, operating system images and applications, to quantum processor 108.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gates, are reversible. Examples of quantum logic gates include RX (performs $e^{j\theta X}$, which corresponds to a rotation of the qubit state around the X-axis by the given angle theta $\theta$ on the Bloch sphere), RY (performs $e^{j\theta Y}$, which corresponds to a rotation of the qubit state around the Y-axis by the given angle theta $\theta$ on the Bloch sphere), RXX (performs the operation $e^{(-i\theta/2 X \oplus X)}$ on the input qubit), RZZ (takes in one input, an angle theta $\theta$ expressed in radians, and it acts on two qubits), etc. In one embodiment, circuits 109 are written such that the horizontal axis is time, starting at the left hand side and ending at the right hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, as discussed above, quantum computer 101 includes quantum memory (also referred to herein as simply "memory") 110 which may provide data, such as boot files, operating system images, and applications (e.g., applications 111) to quantum processor 108. In one embodiment, memory 110 is a set of quantum bits that store quantum states for later retrieval. The state stored in quantum memory 110 can retain quantum superposition.

In one embodiment, memory 110 includes an application 111 that may be configured to implement one or more of the methods described herein in accordance with one or more embodiments. For example, application 111 may implement a program for preempting a quantum program as discussed further below in connection with FIGS. 2-6. Examples of memory 110 include light quantum memory, solid quantum memory, gradient echo memory, electromagnetically induced transparency, etc.

Furthermore, in one embodiment, memory 110 stores a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit is an open-source software development kit for working with quantum computers at the level of circuits, pulses and algorithms) converts the trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

In one embodiment, memory 110 stores measurements 113 from previously executed shots of quantum circuit 109 as well as stores quantum state 114 of quantum circuit 109 as discussed further below. Furthermore, as discussed further below, the various quantum data structures 115 and quantum queue 116 are stored in memory 110.

In one embodiment, quantum controller 107 performs the quantum program scheduling involving interrupting and preempting a running quantum circuit 109. In one embodiment, preemption is determined by quantum controller 107 based on identifying scenarios in which a quantum circuit 109 is being executed by quantum processor 108 to process a low priority and/or long-running quantum job that is preventing a high priority and/or short-running quantum job from being processed. In one embodiment, the quantum program, which includes a sequence of instructions that are capable of running on quantum computer 101, defines the job(s) as well as indirectly the length of time to process the job based on the number of instructions. For example, such jobs may be system-level jobs (e.g., calibrations, periodic updates). In one embodiment, the priority level of such jobs may be defined in a quantum data structure 115 stored in quantum memory 110. For example, system-level quantum jobs may be defined as having a very high priority level. In one embodiment, such information is stored in quantum data structure 115 by encoding such information in quantum bits.

In one embodiment, prior to quantum processor 108 executing a quantum circuit 109 to process a job of the quantum program, quantum controller 107 accesses quantum data structure 115 for the priority level of the job to be processed by quantum circuit 108. In one embodiment, the length of time to process a job is based on a number of instructions obtained from the quantum program. In one embodiment, quantum data structure 115 stored in quantum memory 110 contains a listing of a length of time to process a job based on the number of instructions obtained from the quantum program. In one embodiment, such information is encoded in quantum bits in quantum data structure 115. In one embodiment, quantum controller 107 access quantum data structure 115 for the length of time to process a job.

In one embodiment, quantum controller 107 stores the jobs prior to being processed by quantum circuit 109 in a quantum queue 116 of memory 110. In one embodiment, such jobs are normally processed in a FIFO (first-in first-out) order without preemption occurring. A wait-time estimate for each of these jobs may be performed by quantum controller 107. In one embodiment, such a wait-time estimate is provided through the IBM® Quantum Platform and via Qiskit®. In one embodiment, the computed time is the result of a scheduling simulation that predicts one possible execution pattern, given the current ordering, such as via a fair-share algorithm, of all the jobs waiting for that system and the approximate runtime of each job. In one embodiment, when an accurate estimation of time is not feasible, the maximum allowed runtime is used as a proxy.

After determining the wait times and the priorities of such jobs, quantum controller 107 determines whether preemption of the quantum program is necessary to improve throughput and to more efficiently use the computing resources of quantum computer 101 based on the priority levels, processing times (length of time to process jobs) and/or wait-time estimates. Such information may be used by scheduling algorithms (e.g., shortest time quantum scheduling algorithm, priority scheduling algorithm) implemented by quantum controller 107 to determine if preemption is necessary, and if so, when to preempt. The principles of the present disclosure are to include any scheduling means for determining whether preemption of the quantum program is necessary and when to preempt. Furthermore, the principles of the present disclosure are to include any scheduling means for determining which of the various means for preemption to employ, where such means of preemption is discussed below.

In one embodiment, quantum controller 107 preempts a quantum program in-between shots or within the same shot. A "quantum program," as used herein, refers to a sequence of instructions that are capable of running on quantum computer 101. In one embodiment, the quantum program defines quantum circuit 109 and the number of shots executed by quantum circuit 109. In one embodiment, a quantum program completes when quantum circuit 109 has been executed within the defined number of shots. A "shot," as used herein, refers to one complete execution of quantum circuit 109. The number of shots defines how many times quantum circuit 109 is to be repeatedly executed so as to obtain a readout of a state of each quantum bit to meet a threshold result accuracy of quantum circuit 109.

In one embodiment, quantum controller 107 preempts a quantum program in-between shots by interrupting quantum circuit 109 following completion of a shot. After completion of the shot, a new quantum circuit 109 is loaded for execution by quantum processor 108. Once the new quantum circuit 109 has completed execution by quantum processor 108 or has been preempted by quantum controller 107, the original quantum circuit 109 is loaded for the remaining shots. That is, once the new quantum circuit 109 has completed execution by quantum processor 108 or has been preempted by quantum controller 107, quantum processor 108 completes execution of the original quantum circuit 109.

In one embodiment, after quantum controller 107 preempts the quantum program in-between shots, the measurements 113 from the previously executed shots of quantum circuit 109 are stored in quantum memory 110, such as by quantum controller 107 quantum teleporting measurements 113 (measurements from the previously executed shots of quantum circuit 109) from quantum processor 108 to quantum memory 110.

In one embodiment, the quantum program instructions are divided into "chunks" similar to time slices in the classical computing world in order to speed up the context switch. In one embodiment, each chunk is at the end of an instruction where execution can be stopped via preemption without interrupting the state of the program. For example, a "chunk" may correspond to the end of the instruction which corresponds to the end of a shot. In another example, a "chunk" may correspond to the interruption point corresponding to the point of performing an operation on the quantum bit carrying classical information as discussed further below.

In one embodiment, quantum controller 107 preempts a quantum program within a shot by interrupting quantum circuit 109 within a shot (within one complete execution of quantum circuit 109). In such an embodiment, quantum controller 107 stores the quantum state 114 of quantum circuit 109, such as by quantum teleporting quantum state 114 of quantum circuit 109 from quantum processor 108 to quantum memory 110. In one embodiment, quantum memory 110 is implemented with a high-fidelity quantum bit, such as a trapped ion, to help preserve the stability of the quantum state. In one embodiment, quantum state 114 is saved in an unused quantum bit of quantum memory 110.

In one embodiment, upon preempting the quantum program within the shot, a new quantum circuit 109 is loaded for execution by quantum processor 108. Once the new quantum circuit 109 has completed execution by quantum processor 108 or has been preempted by quantum controller 107, the original quantum circuit 109 is loaded for execution by quantum processor 108. That is, once the new quantum circuit 109 has completed execution by quantum processor 108 or has been preempted by quantum controller 107, quantum processor 108 completes execution of the original quantum circuit 109. In one embodiment, the original quantum circuit 109 is loaded with the stored quantum state 114, such as by quantum controller 107 quantum teleporting quantum state 114 of quantum circuit 109 from quantum memory 110 to quantum processor 108.

In one embodiment, quantum controller 107 identifies the quantum bits that carry classical information. In one embodiment, quantum bits that carry classical information (i.e., discrete information, such as only being a 0 or a 1) are indicated in quantum data structure 115 which specifies which quantum bits are carrying classical information. Such information is stored in quantum data structure 115 by encoding the information in quantum bits. In one embodiment, quantum controller 107 accesses quantum data structure 115 stored in quantum memory 110 to identify which quantum bits carry classical information.

In one embodiment, the information pertaining to the quantum bits that carry classical information (i.e., discrete information, such as only being a 0 or a 1) is stored in a classical data structure, such as in memory 117 (discussed further below) of classical computer 102. In such an embodiment, data is stored in classical bits; however, quantum controller 107 accesses such information in a quantum way by reading several bits in superposition.

In one embodiment, in response to quantum circuit 109 performing operations on the quantum bits that carry classical information and preemption is deemed necessary by quantum controller 107, quantum controller 107 interrupts execution of quantum circuit 109 at the point of performing an operation on the quantum bit carrying classical information, such as within a shot. A new quantum circuit 109 is then loaded for executed by quantum processor 108. Once the new quantum circuit 109 has completed execution by quantum processor 108 or has been preempted by quantum controller 107, the original quantum circuit 109 is loaded for executed by quantum processor 108. That is, once the new quantum circuit 109 has completed execution by quantum processor 108 or has been preempted by quantum controller 107, quantum processor 108 completes execution of the original quantum circuit 109 starting from the interruption point.

In one embodiment, such a preemption involving pre-empting the quantum program at the point of quantum circuit 109 performing an operation on the quantum bit carrying classical information may occur during a reset or during a mid-circuit measurement. In such an embodiment, quantum teleportation does not need to be performed thereby providing a faster context switching.

Furthermore, as shown in FIG. 1, classical computer 102, which is used to setup the state of quantum bits in quantum computer 101, may be connected to quantum computer 101 via a network 118.

Network 118 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, as shown in FIG. 1, classical computer 102 includes a memory 117 (e.g., static random access memory, dynamic random access memory, read only memory, flash memory, hard disk drive, floppy disk, optical disk, etc.) that stores an application 119, which may also be configured to implement one or more of the methods described herein in accordance with one or more embodiments. For example, in one embodiment, application 119 may implement a program for preempting a quantum program as discussed further below in connection with FIGS. 2-6.

System 100 is not to be limited in scope to any one particular network architecture. System 100 may include any number of quantum computers 101, classical computers 102 and networks 118.

In the embodiments in which application 119 is configured to implement one or more of the methods described herein in accordance with one or more embodiments, the following is applicable.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, currently, quantum computers do not have the capability of implementing preemption as classical computers/classical schedulers implement. A "classical computer" is a computing device in which information is stored in bits that are represented logically by either a 0 (off) or a 1 (on). A "classical scheduler" is a scheduler of a classical computing device that controls the program execution of jobs. A "job" is a unit work made up of one or more tasks, which when performed, signify the execution of a job. Such classical schedulers are utilized by a classical computer in order to more efficiently execute jobs thereby improving throughput (volume of work or information flowing through a system) and improving efficiency in using computing resources. For example, the classical scheduler may determine that throughput and efficiency can be improved by executing a high priority job prior to a low priority job. In such an example, the classical scheduler may preempt a currently executed low priority job thereby allowing execution of the high priority job prior to the completion of the low priority job. In another example, the classical scheduler may determine that throughput and efficiency can be improved by executing a short-running job (time to execute job is a relatively short period of time) prior to a long-running job (time to execute job is a relatively long period of time). In such an example, the classical scheduler may preempt a currently executed long-running job thereby allowing execution of the short-running job prior to the completion of the long-running job. As a result of not being able to utilize preemption as classical computers/classical schedulers implement, high priority quantum jobs and/or short-running quantum jobs may remain unexecuted for a duration of time as a low priority and/or long-running quantum job is being executed thereby resulting in reduced throughput and inefficient use of computing resources by the quantum computer. For example, high priority quantum jobs, such as calibrations and periodic updates, occur regularly and need to be executed without delay. However, by not being able to interrupt the processing of a job, such as a long-running, low priority quantum job currently being executed, such high priority quantum jobs have to wait to be executed until the long-running, low priority quantity job has completed execution resulting in reduced throughput and an inefficient use of computing resources by the quantum computer.

Figure 2:
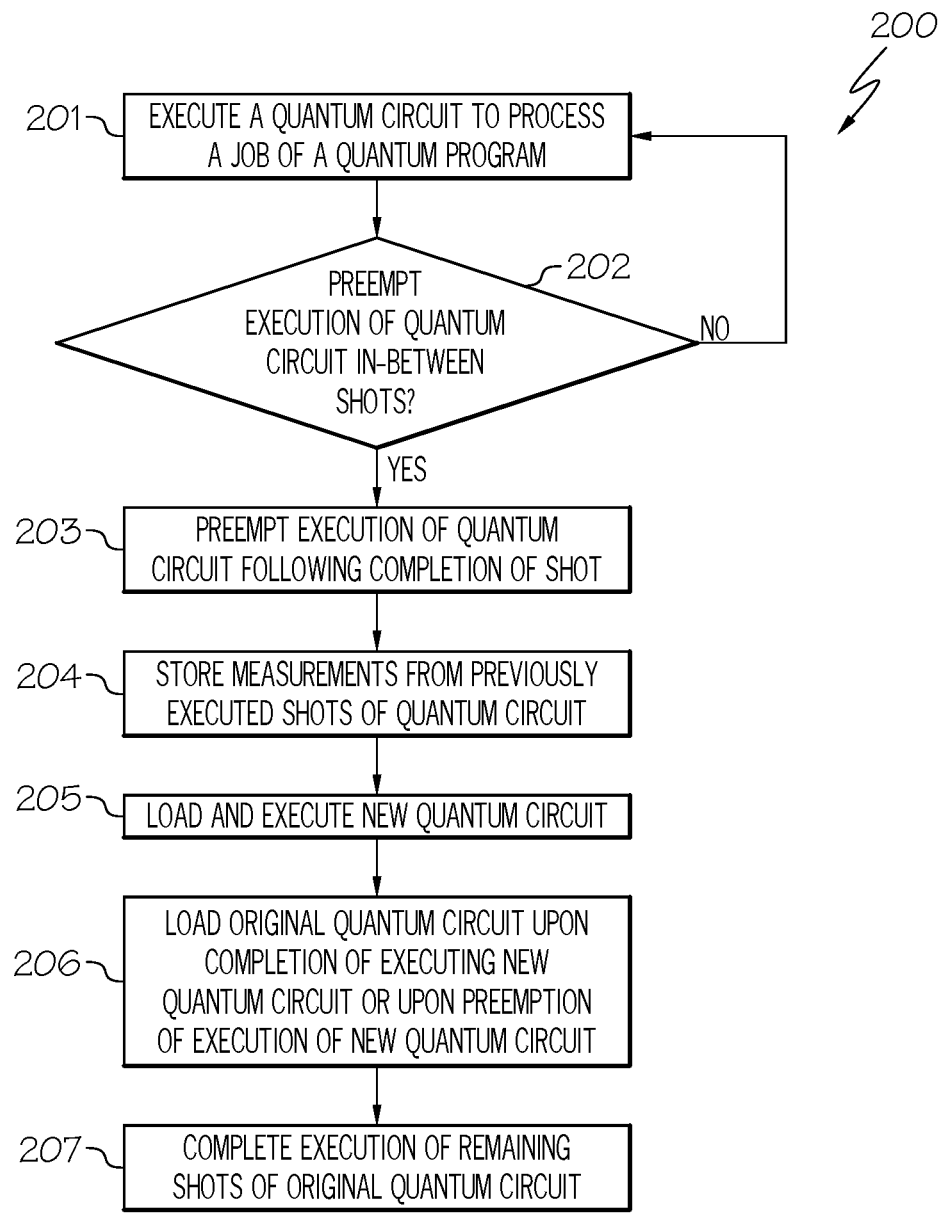
FIG. 2 is a flowchart of a method for preempting a quantum program in-between shots in accordance with an embodiment of the present disclosure.
Figure 3:
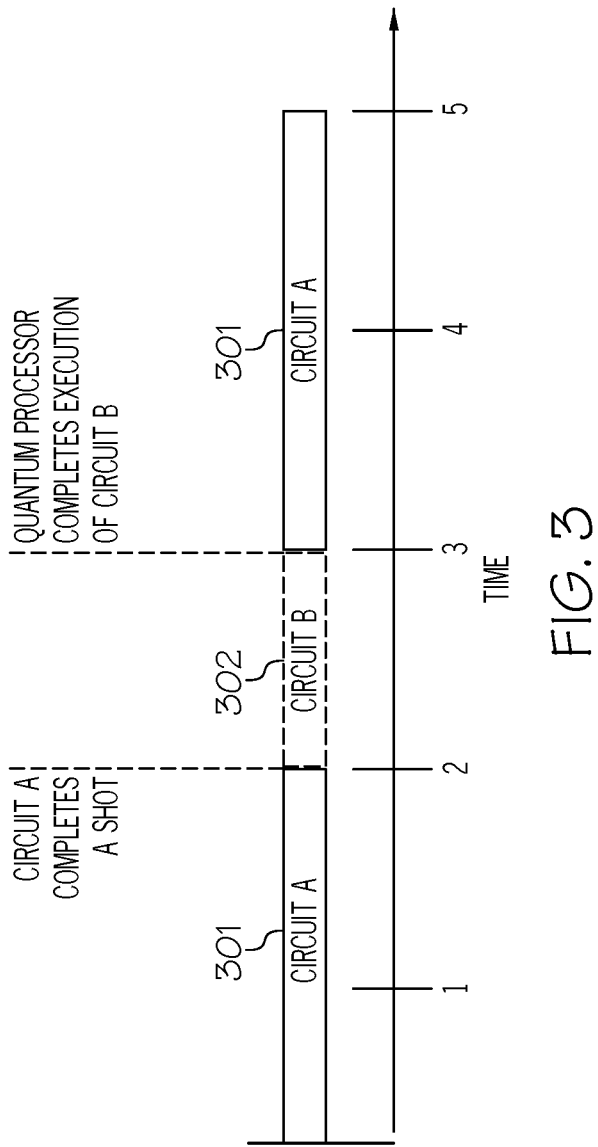
FIG. 3 illustrates preempting a quantum program in-between shots in accordance with an embodiment of the present disclosure.
Figure 4:
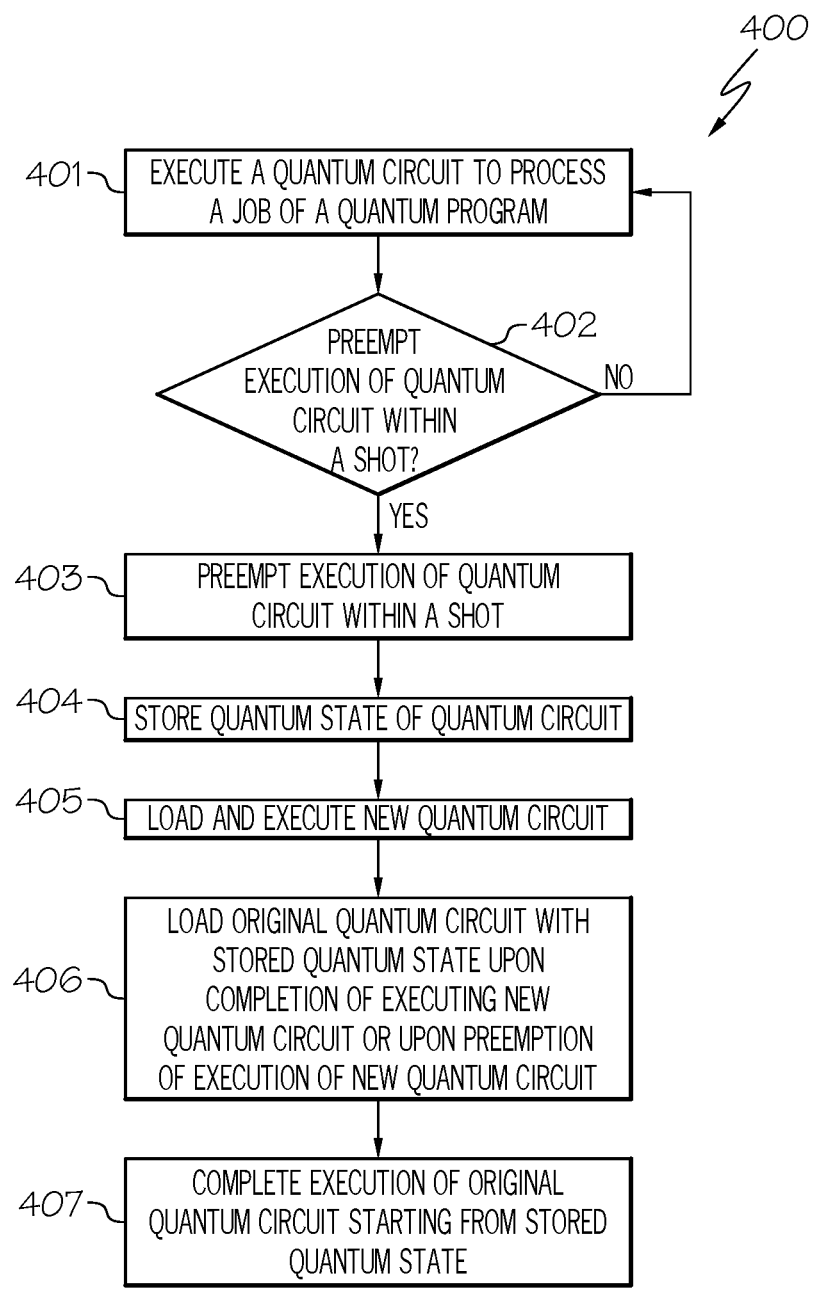
FIG. 4 is a flowchart of a method for preempting a quantum program within the same shot in accordance with an embodiment of the present disclosure.
Figure 5:
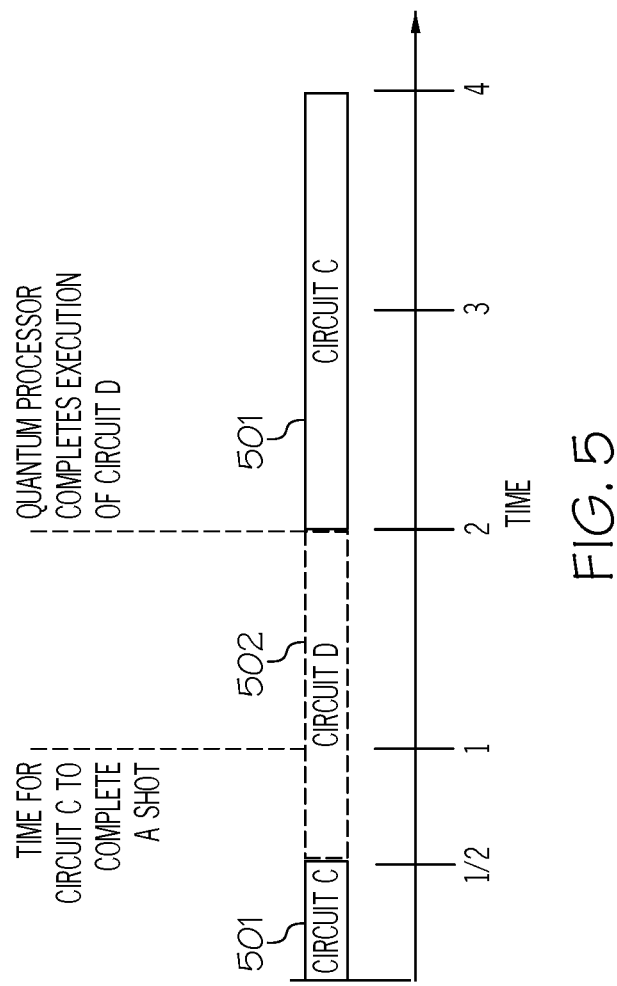
FIG. 5 illustrates preempting a quantum program within the same shot in accordance with an embodiment of the present disclosure.
Figure 6:
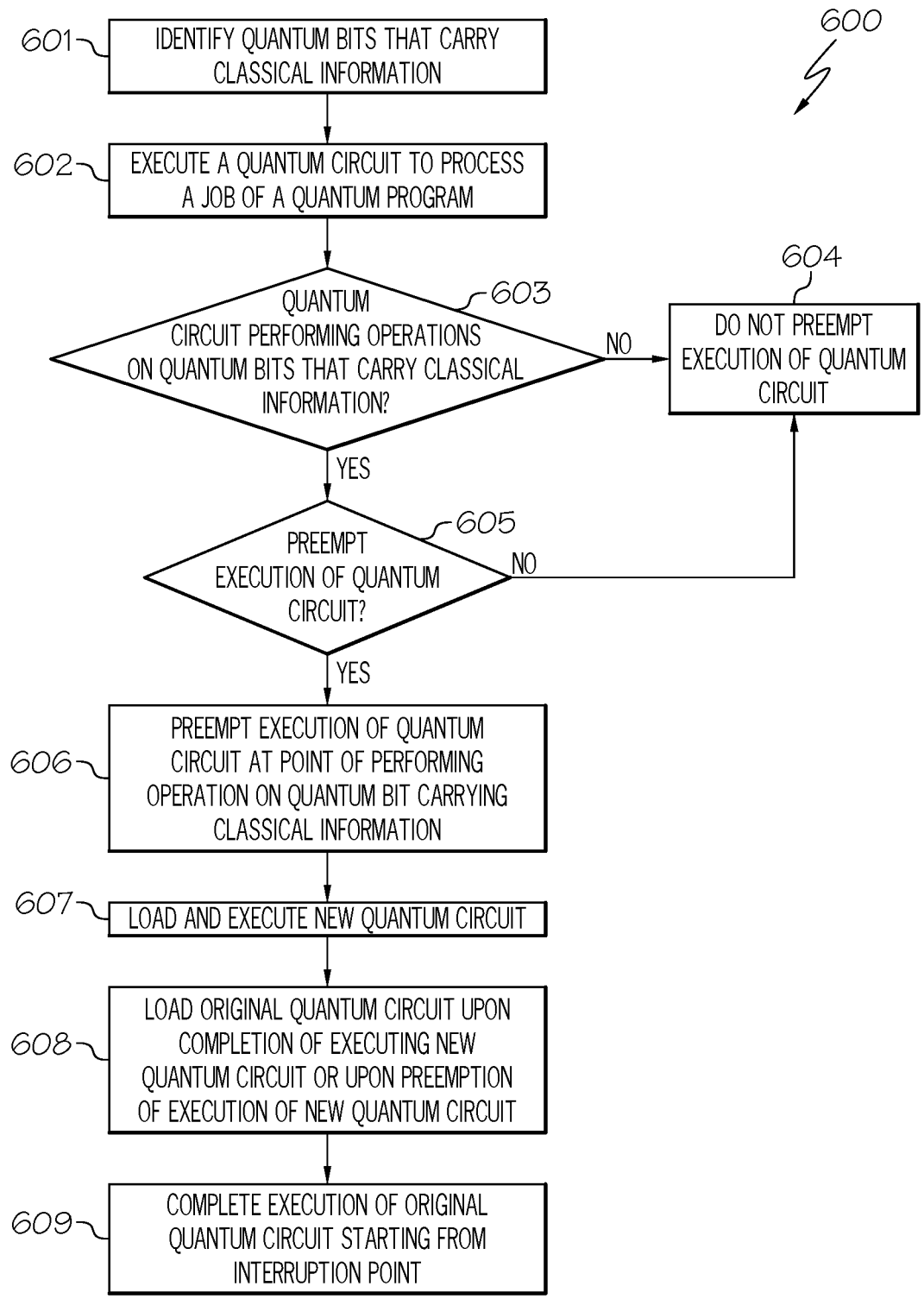
FIG. 6 is a flowchart of a method for preempting a quantum program at the point of performing an operation on a quantum bit carrying classical information in accordance with an embodiment of the present disclosure.

The embodiments of the present disclosure provide a means for enabling quantum computers to preempt a quantum program such that high priority quantum jobs or short-running quantum jobs may be able to run and finish earlier with respect to a low priority and/or long-running quantum job even if the low priority and/or long-running quantum job was previously executed thereby improving throughput as discussed below in connection with FIGS. 2-6. FIG. 2 is a flowchart of a method for preempting a quantum program in-between shots. FIG. 3 illustrates preempting a quantum program in-between shots. FIG. 4 is a flowchart of a method for preempting a quantum program within the same shot. FIG. 5 illustrates preempting a quantum program within the same shot. FIG. 6 is a flowchart of a method for preempting a quantum program at the point of performing an operation on a quantum bit carrying classical information.

As stated above, FIG. 2 is a flowchart of a method 200 for preempting a quantum program in-between shots in accordance with an embodiment of the present disclosure.

Referring to FIG. 2, in conjunction with FIG. 1, in step 201, quantum processor 108 executes a quantum circuit 109 to process a job of a quantum program.

As discussed above, a "quantum program," as used herein, refers to a sequence of instructions that are capable of running on quantum computer 101. In one embodiment, the quantum program defines quantum circuit 109 and the number of shots executed by quantum circuit 109. In one embodiment, a quantum program completes when quantum circuit 109 has been executed within the defined number of shots. A "shot," as used herein, refers to one complete execution of quantum circuit 109. The number of shots defines how many times quantum circuit 109 is to be repeatedly executed so as to obtain a better readout of a state of a quantum bit. A "job," as used herein, refers to a unit work made up of one or more tasks, which when performed, signify the execution of a job. In one embodiment, the quantum program includes a sequence of instructions providing jobs to be processed by quantum circuit 109.

In step 202, a determination is made by quantum controller 107 as to whether to preempt (i.e., interrupt quantum processor 108 executing quantum circuit 109 which is resumed at a later time) execution of quantum circuit 109 in-between shots.

As discussed above, quantum controller 107 may utilize any scheduling means for determining which of the various means for preemption to employ, such as preempting in-between shots. For example, quantum controller 107 may utilize a scheduling means that preempts execution of quantum circuit 109 in-between shots when a quantum circuit 109 is processing a low priority job which is preventing a high priority job, such as a system-level job, from being processed, and quantum circuit 109 has only implemented more than a single shot but fewer than a user-designated number of shots that is less than a user-designated percentage of the total number of shots to be executed by quantum circuit 109.

If quantum controller 107 determines to not preempt (i.e., interrupt quantum processor 108 executing quantum circuit 109 which is resumed at a later time) execution of quantum circuit 109 in-between shots, then quantum processor 108 continues to execute quantum circuit 109 to process a job of a quantum program in step 201.

If, however, quantum controller 107 determines to preempt (i.e., interrupt quantum processor 108 executing quantum circuit 109 which is resumed at a later time) execution of quantum circuit 109 in-between shots, then, in step 203, quantum controller 107 preempts execution of quantum circuit 109 by interrupting quantum circuit 109 following completion of a shot.

In step 204, quantum controller 107 stores the measurements 113 from the previously executed shots of quantum circuit 109 in quantum memory 110, such as by quantum controller 107 quantum teleporting measurements 113 (measurements from the previously executed shots of quantum circuit 109) from quantum processor 108 to quantum memory 110.

In step 205, quantum controller 107 loads the new quantum circuit 109 to be executed by quantum processor 108, such as the new quantum circuit 109 to process a job that has a higher priority and/or shorter-running time than the job whose processing was preempted. Such a job may be from the same quantum program as in step 201 or a different quantum program.

In step 206, quantum controller 107 loads the original quantum circuit 109 for the remaining shots. That is, quantum controller 107 loads the original quantum circuit 109 to be executed by quantum processor 108 for the remaining shots.

In one embodiment, the original quantum circuit 109 is loaded upon completion of the execution of the new quantum circuit 109 or upon preemption of the execution of the new quantum circuit 109.

In step 207, quantum processor 108 completes the execution of the remaining shots of the original quantum circuit 109.

An illustration of preempting a quantum program in-between shots is discussed below in connection with FIG. 3.

FIG. 3 illustrates preempting a quantum program in-between shots in accordance with an embodiment of the present disclosure.

Referring to FIG. 3, in conjunction with FIGS. 1-2, after quantum processor 108 has completed execution of a shot for quantum circuit 109 (identified as "Circuit A" 301 in FIG. 3) at time 2, the execution of Circuit A 301 is preempted and the measurements 113 from the previously executed shots of Circuit A 301 are stored, such as in memory 110.

After preempting the execution of Circuit A, a new quantum circuit 109 (identified as "Circuit B" 302 in FIG. 3) is loaded to be executed by quantum processor 108 to process one or more jobs, which are higher priority and/or shorter-running than the job whose processing was preempted, at time 2.

Upon completion of the execution of Circuit B 302 or upon preemption of the execution of Circuit B 302, such as shown at time 3, Circuit A 301 is loaded so that the remaining shots of Circuit A 301 are executed by quantum processor 108 at time 3. As shown in FIG. 3, the completion of the execution of Circuit A 301 occurs at time 5.

Alternatively, preemption may occur within a shot as discussed below in connection with FIG. 4.

FIG. 4 is a flowchart of a method 400 for preempting a quantum program within the same shot in accordance with an embodiment of the present disclosure.

Referring to FIG. 4, in conjunction with FIG. 1, in step 401, quantum processor 108 executes a quantum circuit 109 to process a job of a quantum program.

In step 402, a determination is made by quantum controller 107 as to whether to preempt (i.e., interrupt quantum processor 108 executing quantum circuit 109 which is resumed at a later time) execution of quantum circuit 109 within a shot.

As discussed above, quantum controller 107 may utilize any scheduling means for determining which of the various means for preemption to employ, such as preempting within a shot. For example, quantum controller 107 may utilize a scheduling means that preempts execution of quantum circuit 109 within a shot when a quantum circuit 109 is processing a low priority job which is preventing a high priority job, such as a system-level job, from being processed, and a single shot has not yet been completed (i.e., quantum circuit 109 has not been completely executed a single time).

If quantum controller 107 determines to not preempt (i.e., interrupt quantum processor 108 executing quantum circuit 109 which is resumed at a later time) execution of quantum circuit 109 within a shot, then quantum processor 108 continues to execute quantum circuit 109 to process a job of a quantum program in step 401.

If, however, quantum controller 107 determines to preempt (i.e., interrupt quantum processor 108 executing quantum circuit 109 which is resumed at a later time) execution of quantum circuit 109 within a shot, then, in step 403, quantum controller 107 preempts execution of quantum circuit 109 by interrupting quantum circuit 109 within a shot.

In step 404, quantum controller 107 stores the quantum state 114 of quantum circuit 109, such as by quantum teleporting quantum state 114 of quantum circuit 109 from quantum processor 108 to quantum memory 110. In one embodiment, quantum state 114 is stored in an unused quantum bit.

In step 405, quantum controller 107 loads the new quantum circuit 109 to be executed by quantum processor 108, such as the new quantum circuit 109 to process a job that has a higher priority and/or shorter-running time than the job whose processing was preempted. Such a job may be from the same quantum program as in step 401 or a different quantum program.

In step 406, quantum controller 107 loads the original quantum circuit 109 with the stored quantum state 114 to be executed by quantum processor 108.

In one embodiment, quantum state 114 is loaded with the original quantum circuit 109 by quantum controller 107 quantum teleporting quantum state 114 from quantum memory 110 to quantum processor 108.

In one embodiment, the original quantum circuit 109 is loaded with the stored quantum state 114 upon completion of the execution of the new quantum circuit 109 or upon preemption of the execution of the new quantum circuit 109.

In step 407, quantum processor 108 completes the execution of the original quantum circuit 109, starting from the stored quantum state 114.

An illustration of preempting a quantum program within a shot is discussed below in connection with FIG. 5.

FIG. 5 illustrates preempting a quantum program within a shot in accordance with an embodiment of the present disclosure.

Referring to FIG. 5, in conjunction with FIGS. 1 and 4, prior to quantum processor 108 completing the execution of a shot for quantum circuit 109 (identified as "Circuit C" 501 in FIG. 5), which occurs at time 1, the execution of Circuit C 501 is preempted at time ½ and the quantum state 114 of Circuit C 501 is stored, such as in memory 110.

After preempting the execution of Circuit C 501, a new quantum circuit 109 (identified as "Circuit D" 502 in FIG. 5) is loaded to be executed by quantum processor 108 to process one or more jobs at time ½, which are higher priority and/or shorter-running than the job whose processing was preempted, at time ½.

Upon completion of the execution of Circuit D 502 or upon preemption of the execution of Circuit D 502, such as shown at time 2, Circuit C 501 is loaded with the stored quantum state 114 so that Circuit C 501 is executed by quantum processor 108 starting from the stored quantum state 114 at time 2. As shown in FIG. 5, the completion of the execution of Circuit C 501 occurs at time 4.

Alternatively, preemption may occur at the point of performing an operation on a quantum bit carrying classical information as discussed below in connection with FIG. 6.

FIG. 6 is a flowchart of a method 600 for preempting a quantum program at the point of performing an operation on a quantum bit carrying classical information in accordance with an embodiment of the present disclosure.

Referring to FIG. 6, in conjunction with FIG. 1, in step 601, quantum controller 107 identifies the quantum bits that carry classical information.

As discussed above, in one embodiment, quantum bits that carry classical information (i.e., discrete information, such as only being a 0 or a 1) are indicated in quantum data structure 115 which specifies which quantum bits are carrying classical information. In one embodiment, such information is stored in quantum data structure 115 by encoding the information in quantum bits. In one embodiment, quantum controller 107 accesses quantum data structure 115 stored in quantum memory 110 to identify which quantum bits carry classical information.

In one embodiment, the information pertaining to the quantum bits that carry classical information (i.e., discrete information, such as only being a 0 or a 1) is stored in a classical data structure, such as in memory 117 of classical computer 102. In such an embodiment, data is stored in classical bits; however, quantum controller 107 accesses such information in a quantum way by reading several bits in superposition.

In step 602, quantum processor 108 executes a quantum circuit 109 to process a job of a quantum program.

In step 603, a determination is made by quantum controller 107 as to whether the quantum circuit 109 (quantum circuit 109 processing a job of the quantum program in step 602) is performing operations on quantum bits that carry classical information.

As previously discussed, quantum controller 107 identifies the quantum bits that carry classical information. If quantum circuit 109 is not currently performing operations on such quantum bits, then, in step 604, quantum controller 107 does not preempt the execution of quantum circuit 109. As a result, quantum processor 108 continues to execute quantum circuit 109 to process the job of the quantum program.

If, however, quantum circuit 109 is currently performing operations on such quantum bits that carry classical information, then, in step 605, a determination is made by quantum controller 107 as to whether to preempt (i.e., interrupt quantum processor 108 executing quantum circuit 109 which is resumed at a later time) execution of quantum circuit 109, such as at the point of performing an operation on a quantum bit carrying classical information.

As discussed above, quantum controller 107 may utilize any scheduling means for determining which of the various means for preemption to employ, such as preempting execution of quantum circuit 109 at the point of performing an operation on the quantum bit carrying classical information. For example, quantum controller 107 may utilize a scheduling means that preempts execution of quantum circuit 109 at the point of performing an operation on the quantum bit carrying classical information when quantum circuit 109 is processing a low priority job which is preventing a high priority job, such as a system-level job, from being processed, and quantum circuit 109 is currently performing an operation on the quantum bit carrying classical information.

If quantum controller 107 determines to not preempt (i.e., interrupt quantum processor 108 executing quantum circuit 109 which is resumed at a later time) execution of quantum circuit 109, then, in step 604, quantum controller 107 does not preempt the execution of quantum circuit 109. As a result, quantum processor 108 continues to execute quantum circuit 109 to process the job of the quantum program.

If, however, quantum controller 107 determines to preempt (i.e., interrupt quantum processor 108 executing quantum circuit 109 which is resumed at a later time) execution of quantum circuit 109, then, in step 606, quantum controller 107 preempts execution of quantum circuit 109 at the point of performing an operation on a quantum bit carrying classical information, such as within a shot.

In step 607, quantum circuit 107 loads the new quantum circuit 109 to be executed by quantum processor 108, such as the new quantum circuit 109 to process a job that has a higher priority and/or shorter-running time than the job whose processing was preempted. Such a job may be from the same quantum program as in step 602 or a different quantum program.

In step 608, quantum controller 107 loads the original quantum circuit 109 to be executed by quantum processor 108.

In one embodiment, the original quantum circuit 109 is loaded upon completion of the execution of the new quantum circuit 109 or upon preemption of the execution of the new quantum circuit 109.

In step 609, quantum processor 108 completes the execution of the original quantum circuit 109, starting from the interruption point.

In one embodiment, such a preemption involving preempting the quantum program at the point of quantum circuit 109 performing an operation on the quantum bit carrying classical information may occur during a reset or during a mid-circuit measurement. In such an embodiment, quantum teleportation does not need to be performed thereby providing a faster context switching.

As a result of the foregoing, the principles of the present disclosure provide a means for enabling quantum computers to preempt a quantum program such that high priority quantum jobs and/or short-running quantum jobs may be able to run and finish earlier with respect to a low priority and/or long-running quantum job even if the low priority and/or long-running quantum job was previously executed. As a result, throughput may be improved.

Furthermore, the principles of the present disclosure improve the technology or technical field involving quantum computers.

As discussed above, currently, quantum computers do not have the capability of implementing preemption as classical computers/classical schedulers implement. A "classical computer" is a computing device in which information is stored in bits that are represented logically by either a 0 (off) or a 1 (on). A "classical scheduler" is a scheduler of a classical computing device that controls the program execution of jobs. A "job" is a unit work made up of one or more tasks, which when performed, signify the execution of a job. Such classical schedulers are utilized by a classical computer in order to more efficiently execute jobs thereby improving throughput (volume of work or information flowing through a system) and improving efficiency in using computing resources. For example, the classical scheduler may determine that throughput and efficiency can be improved by executing a high priority job prior to a low priority job. In such an example, the classical scheduler may preempt a currently executed low priority job thereby allowing execution of the high priority job prior to the completion of the low priority job. In another example, the classical scheduler may determine that throughput and efficiency can be improved by executing a short-running job (time to execute job is a relatively short period of time) prior to a long-running job (time to execute job is a relatively long period of time). In such an example, the classical scheduler may preempt a currently executed long-running job thereby allowing execution of the short-running job prior to the completion of the long-running job. As a result of not being able to utilize preemption as classical computers/classical schedulers implement, high priority quantum jobs and/or short-running quantum jobs may remain unexecuted for a duration of time as a low priority and/or long-running quantum job is being executed thereby resulting in reduced throughput and inefficient use of computing resources by the quantum computer. For example, high priority quantum jobs, such as calibrations and periodic updates, occur regularly and need to be executed without delay. However, by not being able to interrupt the processing of a job, such as a long-running, low priority quantum job currently being executed, such high priority quantum jobs have to wait to be executed until the long-running, low priority quantity job has completed execution resulting in reduced throughput and an inefficient use of computing resources by the quantum computer.

Embodiments of the present disclosure improve such technology by executing a first quantum circuit by a quantum processor to process a first job of the quantum program for a number of shots, where the number of shots defines how many times a quantum circuit is to be repeatedly executed so as to obtain a better readout of a state of a quantum bit. A "quantum program," as used herein, refers to a sequence of instructions that are capable of running on the quantum computer. In one embodiment, the quantum program defines the quantum circuit and the number of shots executed by the quantum circuit. In one embodiment, a quantum program completes when the quantum circuit has been executed within the defined number of shots. The execution of the first quantum circuit to process the first job is then preempted, such as to allow a higher priority and/or shorter-running job to be processed. Upon preempting the execution of the first quantum circuit to process the first job, the quantum processor executes a second quantum circuit to process a second job (e.g., higher priority and/or shorter-running job to be processed). Upon completion of the execution of the second quantum circuit to process the second job or upon preemption of the execution of the second quantum circuit to process the second job, the quantum processor completes the execution of the first quantum circuit to process the first job. In this manner, quantum computers are able to preempt a quantum program such that high priority quantum jobs and/or short-running quantum jobs may be able to run and finish earlier with respect to a low priority and/or long-running quantum job even if the low priority and/or long-running quantum job was previously executed. As a result, throughput may be improved. Furthermore, in this manner, there is an improvement in the technical field involving quantum computers.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a method for preempting a quantum program comprises executing a first quantum circuit to process a first job of the quantum program for a number of shots, where the number of shots defines how many times a quantum circuit is to be repeatedly executed. The method further comprises preempting execution of the first quantum circuit to process the first job. The method additionally comprises executing a second quantum circuit to process a second job in response to the preemption of execution of the first quantum circuit. Furthermore, the method comprises completing execution of the first quantum circuit to process the first job in response to completion of the execution of the second quantum circuit to process the second job or upon preemption of the execution of the second quantum circuit to process the second job.

Additionally, in one embodiment of the present disclosure, the method further comprises having the execution of the first quantum circuit to process the first job be preempted between shots. The method additionally comprises storing measurements from previously executed shots of the first quantum circuit.

Furthermore, in one embodiment of the present disclosure, the method additionally comprises loading the first quantum circuit to be executed for remaining shots.

Additionally, in one embodiment of the present disclosure, the method further comprises completing execution of the remaining shots of the first quantum circuit upon loading the first quantum circuit.

Furthermore, in one embodiment of the present disclosure, the method additionally comprises having the execution of the first quantum circuit to process the first job be preempted within a shot. The method further comprises storing a quantum state of the first quantum circuit in a quantum memory Additionally, in one embodiment of the present disclosure, the method further comprises having the execution of the first quantum circuit to process the first job be preempted within a shot. The method additionally comprises teleporting a quantum state of the first quantum circuit from a quantum processor to a quantum memory as part of the preemption.

Furthermore, in one embodiment of the present disclosure, the method additionally comprises teleporting the quantum state of the first quantum circuit to the quantum processor from the quantum memory as part of completing the execution of the first quantum circuit to process the first job.

Additionally, in one embodiment of the present disclosure, the method further comprises having the execution of the first quantum circuit to process the first job be preempted within a shot. The method additionally comprises identifying quantum bits that carry classical information. Furthermore, the method comprises preempting execution of the first quantum circuit at a point of performing an operation on a quantum bit carrying classical information.

Furthermore, in one embodiment of the present disclosure, the method additionally comprises completing the execution of the first quantum circuit to process the first job starting from the point of performing the operation on the quantum bit carrying classical information.

Additionally, in one embodiment of the present disclosure, the method further comprises having the preemption be performed by a quantum computer's controller.

Furthermore, in one embodiment, a quantum computing device comprises a quantum processor configured to perform computational tasks, where the quantum processor includes one or more quantum circuits. Furthermore, the quantum processor is configured to execute a first quantum circuit to process a first job of a quantum program for a number of shots, where the number of shots defines how many times a quantum circuit is to be repeatedly executed. The quantum computing device further comprises a quantum controller configured to preempt execution of the first quantum circuit to process the first job, where the quantum processor executes a second quantum circuit to process a second job in response to the preemption of execution of the first quantum circuit, and where the quantum processor completes execution of the first quantum circuit to process the first job in response to completion of the execution of the second quantum circuit to process the second job or upon preemption of the execution of the second quantum circuit to process the second job.

Additionally, in one embodiment of the present disclosure, the quantum computing device further comprises having the execution of the first quantum circuit to process the first job be preempted between shots, where the quantum controller stores measurements from previously executed shots of the first quantum circuit.

Furthermore, in one embodiment of the present disclosure, the quantum computing device additionally comprises having the quantum controller load the first quantum circuit to be executed for remaining shots.

Additionally, in one embodiment of the present disclosure, the quantum computing device further comprises having the quantum processor complete execution of the remaining shots of the first quantum circuit upon loading the first quantum circuit.

Furthermore, in one embodiment of the present disclosure, the quantum computing device additionally comprises having the execution of the first quantum circuit to process the first job be preempted within a shot. Additionally, the quantum computing device comprises a quantum memory configured to store a quantum state of the first quantum circuit.

Additionally, in one embodiment of the present disclosure, the quantum computing device further comprises having the quantum controller teleport a quantum state of the first quantum circuit from the quantum processor to the quantum memory as part of the preemption.

Furthermore, in one embodiment of the present disclosure, the quantum computing device additionally comprises having the quantum controller teleport the quantum state of the first quantum circuit to the quantum processor from the quantum memory as part of completing the execution of the first quantum circuit to process the first job.

Additionally, in one embodiment of the present disclosure, the quantum computing device further comprises having the quantum controller identify quantum bits that carry classical information.

Furthermore, in one embodiment of the present disclosure, the quantum computing device additionally comprises having the quantum controller preempt execution of the first quantum circuit at a point of performing an operation on a quantum bit carry classical information.

Additionally, in one embodiment of the present disclosure, the quantum computing device further comprises having the quantum processor complete the execution of the first quantum circuit to process the first job starting from the point of performing the operation on the quantum bit carrying classical information.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for preempting a quantum program, the method comprising:
executing a first quantum circuit to process a first job of said quantum program for a number of shots, wherein said number of shots defines how many times a quantum circuit is to be repeatedly executed;
preempting execution of said first quantum circuit to process said first job;
executing a second quantum circuit to process a second job in response to said preemption of execution of said first quantum circuit; and
completing execution of said first quantum circuit to process said first job in response to completion of said execution of said second quantum circuit to process said second job or upon preemption of said execution of said second quantum circuit to process said second job.

2. The method as recited in claim 1, wherein said execution of said first quantum circuit to process said first job is preempted between shots, the method further comprising:
storing measurements from previously executed shots of said first quantum circuit.

3. The method as recited in claim 2 further comprising:
loading said first quantum circuit to be executed for remaining shots.

4. The method as recited in claim 3 further comprising:
completing execution of said remaining shots of said first quantum circuit upon loading said first quantum circuit.

5. The method as recited in claim 1, wherein said execution of said first quantum circuit to process said first job is preempted within a shot, the method further comprising:
storing a quantum state of said first quantum circuit in a quantum memory.

6. The method as recited in claim 1, wherein said execution of said first quantum circuit to process said first job is preempted within a shot, the method further comprising:
teleporting a quantum state of said first quantum circuit from a quantum processor to a quantum memory as part of said preemption.

7. The method as recited in claim 6 further comprising:
teleporting said quantum state of said first quantum circuit to said quantum processor from said quantum memory as part of completing said execution of said first quantum circuit to process said first job.

8. The method as recited in claim 1, wherein said execution of said first quantum circuit to process said first job is preempted within a shot, the method further comprising:
identifying quantum bits that carry classical information; and
preempting execution of said first quantum circuit at a point of performing an operation on a quantum bit carrying classical information.

9. The method as recited in claim 8 further comprising:
completing said execution of said first quantum circuit to process said first job starting from said point of performing said operation on said quantum bit carrying classical information.

10. The method as recited in claim 1, wherein said preemption is performed by a quantum computer's controller.

11. A quantum computing device, comprising:
a quantum processor configured to perform computational tasks, wherein said quantum processor includes one or more quantum circuits, wherein said quantum processor is configured to execute a first quantum circuit to process a first job of a quantum program for a number of shots, wherein said number of shots defines how many times a quantum circuit is to be repeatedly executed; and
a quantum controller configured to preempt execution of said first quantum circuit to process said first job;
wherein said quantum processor executes a second quantum circuit to process a second job in response to said preemption of execution of said first quantum circuit, wherein said quantum processor completes execution of said first quantum circuit to process said first job in response to completion of said execution of said second quantum circuit to process said second job or upon preemption of said execution of said second quantum circuit to process said second job.

12. The quantum computing device as recited in claim 11, wherein said execution of said first quantum circuit to process said first job is preempted between shots, wherein said quantum controller stores measurements from previously executed shots of said first quantum circuit.

13. The quantum computing device as recited in claim 12, wherein said quantum controller loads said first quantum circuit to be executed for remaining shots.

14. The quantum computing device as recited in claim 13, wherein said quantum processor completes execution of said remaining shots of said first quantum circuit upon loading said first quantum circuit.

15. The quantum computing device as recited in claim 11, wherein said execution of said first quantum circuit to process said first job is preempted within a shot, wherein the quantum computing device further comprises:
a quantum memory configured to store a quantum state of said first quantum circuit.

16. The quantum computing device as recited in claim 11, wherein said quantum controller teleports a quantum state of said first quantum circuit from said quantum processor to said quantum memory as part of said preemption.

17. The quantum computing device as recited in claim 16, wherein said quantum controller teleports said quantum state of said first quantum circuit to said quantum processor from said quantum memory as part of completing said execution of said first quantum circuit to process said first job.

18. The quantum computing device as recited in claim 11, wherein said quantum controller identifies quantum bits that carry classical information.

19. The quantum computing device as recited in claim 11, wherein said quantum controller preempts execution of said first quantum circuit at a point of performing an operation on a quantum bit carry classical information.

20. The quantum computing device as recited in claim 19, wherein said quantum processor completes said execution of said first quantum circuit to process said first job starting from said point of performing said operation on said quantum bit carrying classical information.

* * * * *